United States Patent
Salvat I Alabart et al.

(10) Patent No.: US 10,749,835 B2
(45) Date of Patent: Aug. 18, 2020

(54) METHOD AND SYSTEM FOR TRACKING AN EMAIL MESSAGE

(71) Applicant: THE MAIL TRACK COMPANY S.L., Barcelona (ES)

(72) Inventors: Jordi Salvat I Alabart, Barcelona (ES); Gerard Ruiz I Torruella, Barcelona (ES)

(73) Assignee: THE MAIL TRACK COMPANY S.L., Barcelona (ES)

( * ) Notice: Subject to any disclaimer, the term of this patent is extended or adjusted under 35 U.S.C. 154(b) by 0 days.

(21) Appl. No.: 16/473,469

(22) PCT Filed: Dec. 30, 2016

(86) PCT No.: PCT/IB2016/058099
§ 371 (c)(1),
(2) Date: Jun. 25, 2019

(87) PCT Pub. No.: WO2018/122584
PCT Pub. Date: Jul. 5, 2018

(65) Prior Publication Data
US 2019/0342256 A1    Nov. 7, 2019

(51) Int. Cl.
*H04L 12/58*        (2006.01)
(52) U.S. Cl.
CPC ............ *H04L 51/34* (2013.01); *H04L 51/18* (2013.01)
(58) Field of Classification Search
CPC ..................................................... H04L 51/34
See application file for complete search history.

(56) References Cited

U.S. PATENT DOCUMENTS

| | | | |
|---|---|---|---|
| 2006/0253537 A1 | 11/2006 | Thomas | |
| 2007/0260750 A1* | 11/2007 | Feied | H04L 67/06 709/246 |
| 2010/0211648 A1* | 8/2010 | Bhagat | H04L 51/34 709/206 |
| 2012/0150984 A1 | 6/2012 | Farnell et al. | |
| 2016/0315905 A1 | 10/2016 | Gupta | |
| 2016/0373403 A1* | 12/2016 | Seniak | H04L 67/20 |

OTHER PUBLICATIONS

International Search Report for PCT/IB2016/058099 dated Jun. 6, 2017 [PCT/ISA/210].
Written Opinion for PCT/IB2016/058099 dated Jun. 6, 2017 [PCT/ISA/237].

* cited by examiner

*Primary Examiner* — Nicholas P Celani
(74) *Attorney, Agent, or Firm* — Sughrue Mion, PLLC

(57) ABSTRACT

The method comprises embedding, by an application (11), a first tracking mark in an email message (50) to be send to a recipient device (20) via a second server (200), and sending metadata (40) about the email message (50) to a first server (100); storing, by the second server (200), a first copy of the email message (51) and forwarding the email message (50) to said recipient device (20); and detecting when the recipient device (20) opens the email message (50) by the recipient device (20) requesting the embedded first tracking mark to said first server (100), wherein before or after said detecting being performed, said first copy of the email message (51) is replaced with a second copy of the email message (52) including no tracking mark, having embedded therein a second tracking mark or having embedded therein an inactive mark instead of the first tracking mark.

18 Claims, 3 Drawing Sheets

METHOD AND SYSTEM FOR TRACKING AN EMAIL MESSAGE

CROSS REFERENCE TO RELATED APPLICATIONS

This application is a National Stage of International Application No. PCT/IB 2016/058099 filed Dec. 30, 2016.

TECHNICAL FIELD

The present invention relates generally to email applications. In particular, present invention is directed to a method and system for tracking an email message.

BACKGROUND OF THE INVENTION

Current email tracking systems operate by adding a tracking mark such as a tracking pixel to emails sent. This tracking pixel is a reference to an image inserted in the Hypertext Markup Language (HTML) code of the email message. In order to show the message, email clients supporting images (most do, nowadays) will request the image (via its URL) to the tracking service servers. These tracking service servers interpret such a request as a signal that the email message has been read.

When a sender uses an email user agent (i.e. a program that allows to receive and send e-mail messages) to send an email message to a recipient, an email tracking application inserts the tracking mark in the HTML code of the email message, then submits the email message to the sender email user agent for sending, and finally sends the message's metadata to the tracking service server(s) for later reference. The sender email user agent sends the email message to the email service's server, which saves a copy of the email message in a memory thereof (or Sent folder) and transmits the email message to the recipient. When the recipient later uses his own email user agent (recipient email user agent) to view the message, the recipient email user agent will request the tracking mark to the tracking service server(s), signaling that the email message has been read.

This method of operation is typical of individual email tracking systems such as Mailtrack.

The problem this prior solution is that if at any time the sender uses an email user agent, different from the previous sender email user agent that was used to send the email message (referred from now on as different sender email user agent), to access said memory and view the content of the email message, the different sender email user agent will also request the tracking mark from the tracking service server(s), also indicating a reading of the email message. This request by the different sender email user agent is generally indistinguishable from the request of the recipient email user agent.

In the extreme case, where the recipient user email agent and the different sender email user agent are the same brand and model (e.g. the Apple email client on the respective iPhones of the recipient and the sender), the two requests will have the exact same content, making it impossible to tell whether it was the sender or the recipient who read the email message.

Most tracking systems resolve this problem by assuming that all reads have been done by recipients, which easily confuses most users, making them loose confidence in the reliability of the system. This problem is common to all individual email tracking systems operating in the way described before.

DESCRIPTION OF THE INVENTION

To solve the above-mentioned problem, present invention provides a method for tracking an email message, the method comprising as commonly in the field:
a) embedding, by an email tracking application executed in a sender device, a first tracking mark in an email message to be sent to at least one recipient device via a second server (i.e. a sender's email service's server);
b) sending, by the email tracking application, metadata related with the email message such as sender information, recipient information, time, subject, code of the tracking mark, etc. to a first server (i.e. a tracking service server);
c) storing, by the second server, a first copy of the email message in a memory thereof and forwarding the email message to said at least one recipient device; and
d) detecting when the at least one recipient device opens the email message by the recipient device requesting the embedded first tracking mark to said first server, directly or using a third server (e.g. a recipient's email service's server) as a proxy.

Contrary to the known proposals in the field, the method, either before or after said step d) being performed, replaces said first copy of the email message with a second copy of the email message. The second copy of the email message may either include no tracking mark, have embedded therein a second tracking mark different to and instead of the first tracking mark, or have embedded therein an inactive mark instead of the first tracking mark.

The email tracking application is implemented, according to an embodiment, as a web-browser based application (for example running on Chrome, Opera, or Firefox, among others). Alternatively, the email tracking application is implemented as software application executed within a non-web-based email user agent (for example, MS Outlook, the Gmail or Google Inbox clients for Android and iOs, or Apple's iOS mail client).

The replacing of the first copy of the email message by the second copy can be performed via an Internet Message Access Protocol (IMAP) or via an Application Programming Interface (API), i.e. a set of routines, protocols, and tools for building software applications.

The first and second tracking marks and/or the inactive mark preferably comprise a tracking pixel. Besides, the second tracking mark and/or the inactive mark are preferably of a same length as the first tracking mark.

According to an embodiment, the inactive mark comprises a pixel provided by a uniform resource locator (URL) using a "data:" schema.

According to the proposed method, the replacing of the first copy of the email message with the second copy is performed after the first server has accessed the second server, has read the first copy of the email message and has created the second copy of the email message.

In particular, the replacing is enacted by the first server requesting the storage of the second copy of the email message into the second server and also requesting the deletion of the first copy from said second server.

Preferably, a message identifier is embedded, by the second server, in a header field included in both of the first copy of the email message and of the second copy of the email message.

According to an embodiment, the email tracking application in said step a) further adds an email address in a blind carbon copy (Bcc) field of said email message. This added email address causes transmission of the email message by the second server to a fourth server (for example a SMTP server) which upon reception sends an indication to the first server to execute said replacing of the first copy of the email message with the second copy.

According to an embodiment, a timer, configured with a certain period of time, is also set by the first server for performing the replacing of the first copy of the email message with the second copy. In this case, the replacing is triggered once said configured certain period of time has lapsed.

According to the proposed method, once the replacing of the first copy of the email message with the second copy has been performed, the second server may further send a message identifier of the email message and a message identifier of the first copy of the email message to the email tracking application.

Other embodiments of the invention that are disclosed herein include also a system for tracking an email message. The system is configured to implement the method of the first aspect of the invention.

BRIEF DESCRIPTION OF THE DRAWINGS

The previous and other advantages and features will be more fully understood from the following detailed description of embodiments, with reference to the attached figures, which must be considered in an illustrative and non-limiting manner, in which.

DETAILED DESCRIPTION OF THE INVENTION AND OF PREFERRED EMBODIMENTS

Figure 1:
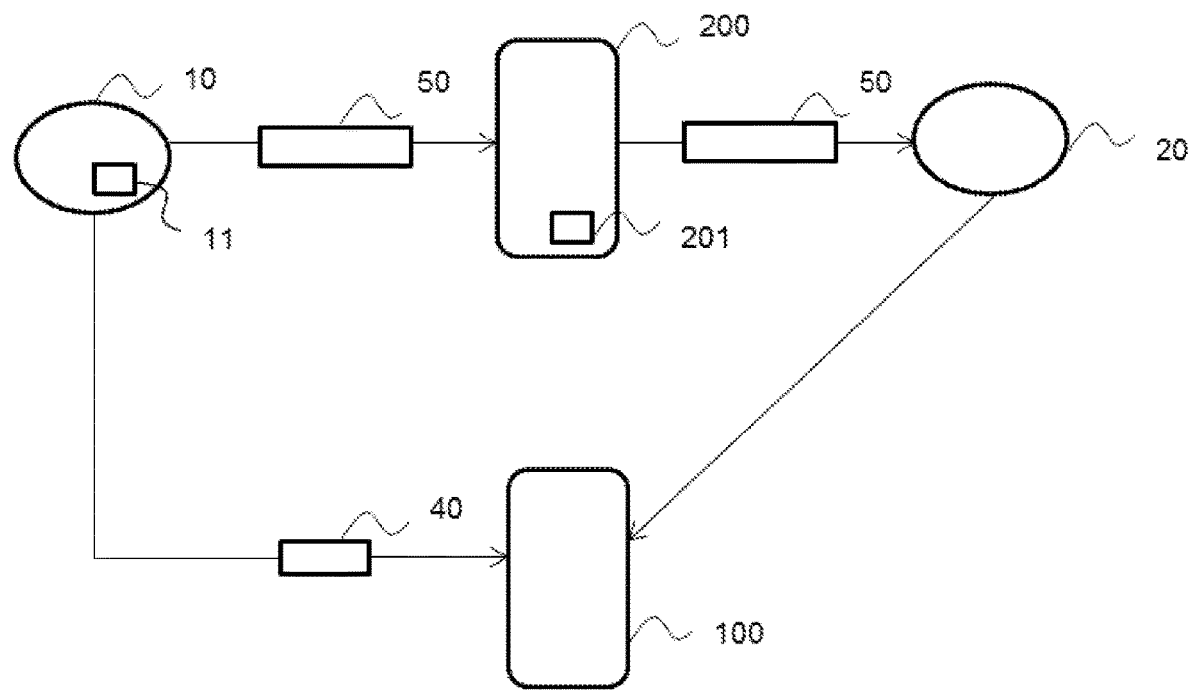
FIGS. 1 and 2 schematically show different embodiments of the proposed system for tracking an email message.
Figure 2:
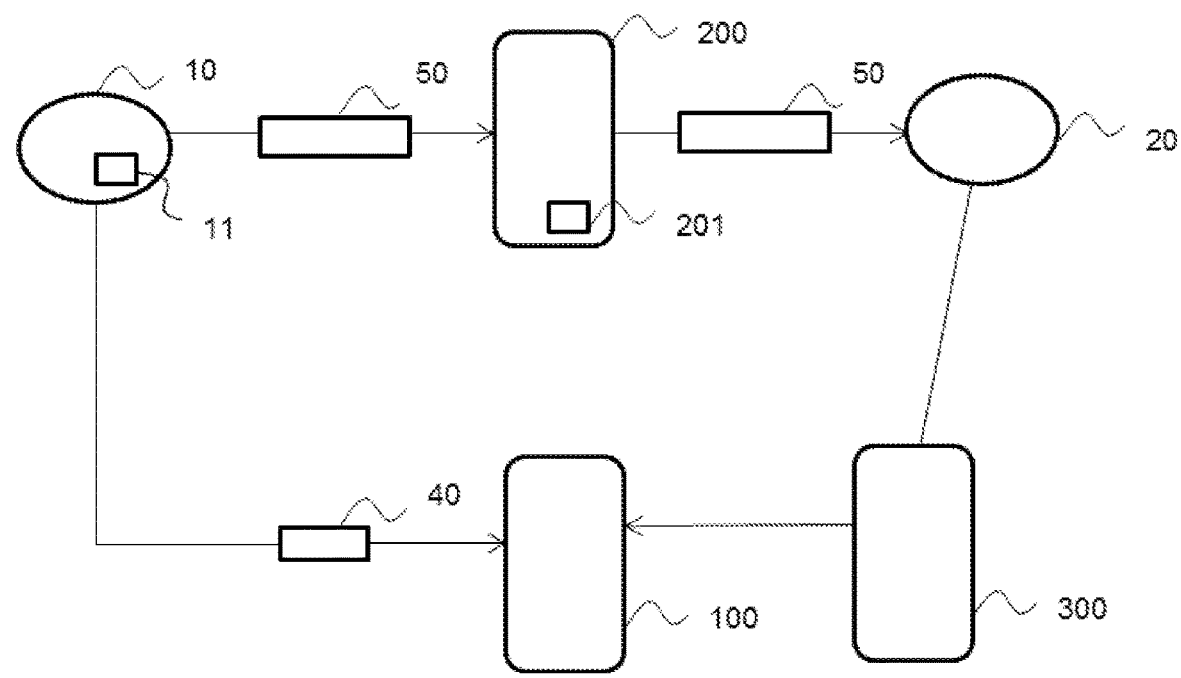

FIGS. 1 and 2 illustrate a system upon which present invention can operate, according to different embodiments of the present invention. Sender device 10 is the computing device used by a sender to send an email message 50 to a recipient device 20 (it could be more than one) via a second server 200 (a sender's email service's server). Sender device 10 and recipient device 20 may include any of a personal computer, a mobile phone, a tablet, a laptop, a PDA, etc. Email tracking application 11 is an application executed in the sender device 10 which is configured to embed in said email message 50 a first tracking mark, preferably a tracking pixel, and configured to send metadata 40 related with the email message 50 (sender information, recipient information, time, subject, code of the tracking mark, etc.) to a first server 100 (or tracking service server).

The email tracking application 11 according to an embodiment is implemented as a web-browser extension, for example running on Chrome, Opera, and/or Firefox. In this case, the email tracking application 11 may interact with the webmail pages (the web pages of a web-based email platform), intercepting communication between these pages and the webmail servers to perform its job. Extension to other browsers (e.g. MS Edge) or to other webmail platforms such as Gmail, Google Inbox, Outlook 365, Yahoo! Mail, or qq Mail, is also possible.

Alternatively, the email tracking application 11 can be implemented to perform the same functionality within a non-web-based email user agent such as MS Outlook, the Gmail or Google Inbox clients for Android and iOS, or Apple's iOS mail client. In this case, a mechanism to inject the email tracking application code into them is required. According to an embodiment, one such mechanism is devised for a mobile web email client using a Mobile APP with a WebView. In addition by using Visual Basic for applications the mechanism can also work in MS Outlook.

Referring back to FIGS. 1 and 2, the second server 200, once it has received the email message 50, stores a first copy of the email message 51 in a memory 201 (or the Sent folder) and forwards the email message 50 to the recipient device 20 (as said before it could forward the email message 50 to more than one recipient device 20 if the sender so requested). The first server 100 detects when the recipient device 20 opens the email message 50 once it receives a request for the first tracking mark from the recipient device 20, either directly (as shown in FIG. 1) or using a third server 300 (e.g. a recipient's email service's server) as a proxy (as shown in FIG. 2).

According to the embodiments of FIGS. 1 and 2, the first server 100 is configured to, once the second server 200 has forwarded the email message 50 to the recipient device 20 (because replacing before the send may cause the second server 200 to send the second copy of the email message 52 instead of the first copy 51, or to not send anything at all) but either before or after said detection of the opening of the email message being performed, request to the second server 200 the replacement of the first copy of the email message 51 with a second copy of the email message 52 (i.e. the first server 100 is configured to access the memory 201, for instance using IMAP of another suitable API, for replacing the first copy of the email message 51 with the second copy 52).

Alternatively, the replacement of the first copy of the email message 51 with the second copy 52 could be requested by the email tracking application 11.

According to present invention, the second copy of the email message 52 may, according to an embodiment, include no tracking mark (i.e. the first tracking mark is removed), may have, according to another embodiment, embedded therein a second tracking mark different to and instead of the first tracking mark (i.e. the first tracking mark is replaced by the second tracking mark in such a way that a request for the second tracking mark can be distinguished from a request for the first tracking mark), or even may have, according to yet another embodiment, embedded therein an inactive mark instead of the first tracking mark and which can be rendered without a request to the first server 100 preferably using a "data:" URL schema as per Internet Engineering Task Force's (IETF) RFC 2397.

Figure 3:
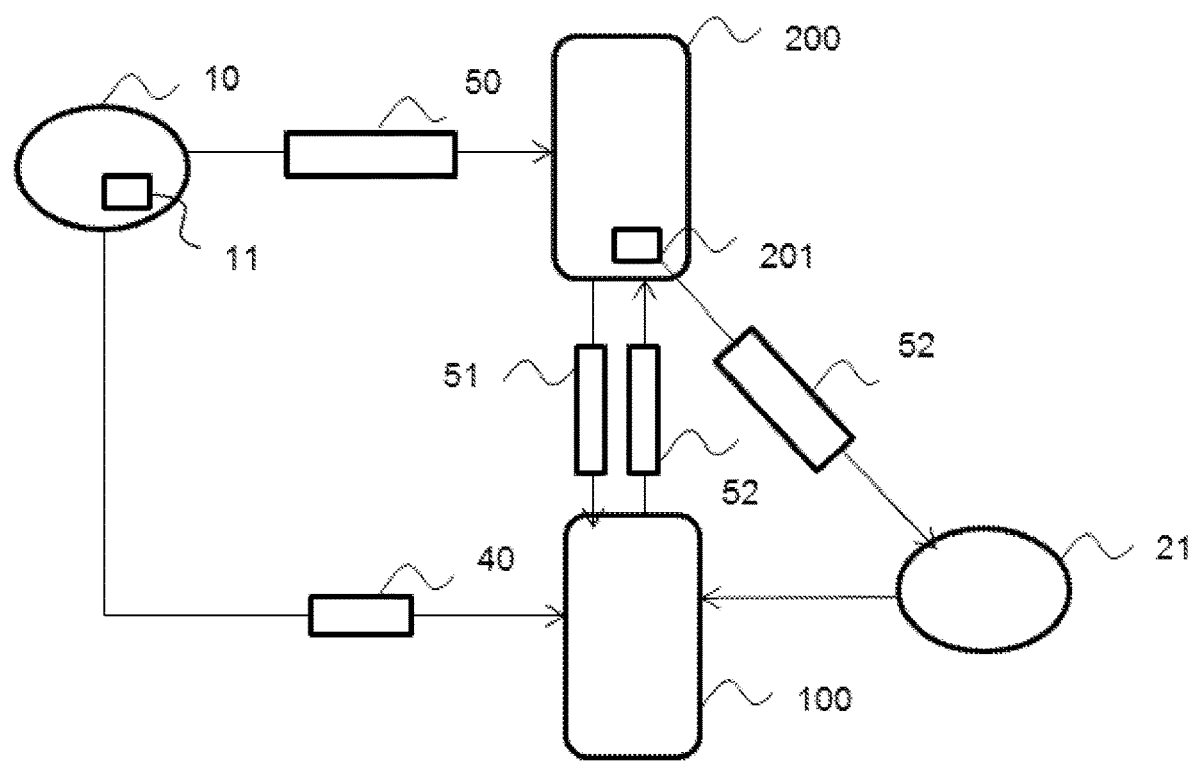
FIGS. 3 and 4 schematically show the flowchart followed by the proposed system when a sender email user agent different to the one used for sending the email message is used to access the email message.
Figure 4:
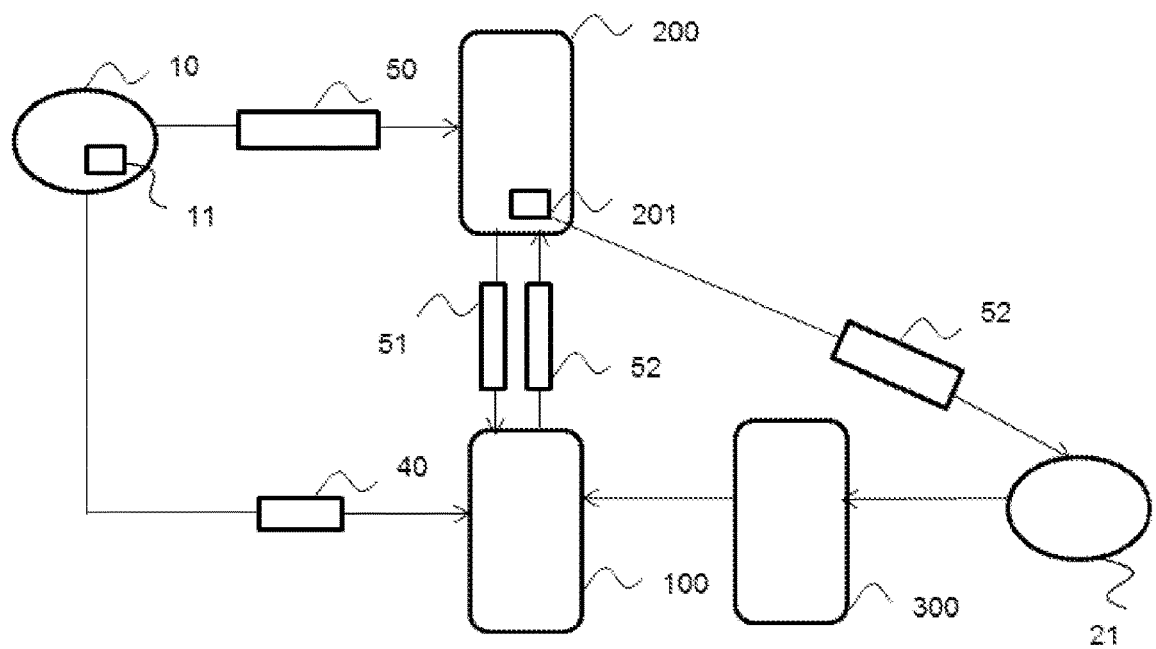

With reference now to FIGS. 3 and 4, these figures illustrate an embodiment in which the user uses a different sender email user agent (different from the sender email user agent that was used to send the email message) to access the message 50 he sent. In this case, he will receive from the second server 200 the second copy of the email message 52, resulting in the different sender email user agent 21 requesting the second tracking mark to the first server 100. Alternatively, in this case not illustrated, in case an inactive tracking mark was used, the different sender user agent 21 will not issue any request at all.

It should be noted that, even though FIGS. 1 to 4 have been illustrated depicting only one first server 100, one second server 200 and one third server 300, each of these servers can be a single server or a cluster of servers working coordinately either in parallel, i.e. all of them performing the same task, and/or serially, i.e. each one performing a part of a task. It should similarly be noted that the transmission of e-mails from a second server 200 to a recipient device 20 usually requires transmission through a number of intermediate servers or Mail Transfer Agents (MTAs).

Figure 5:
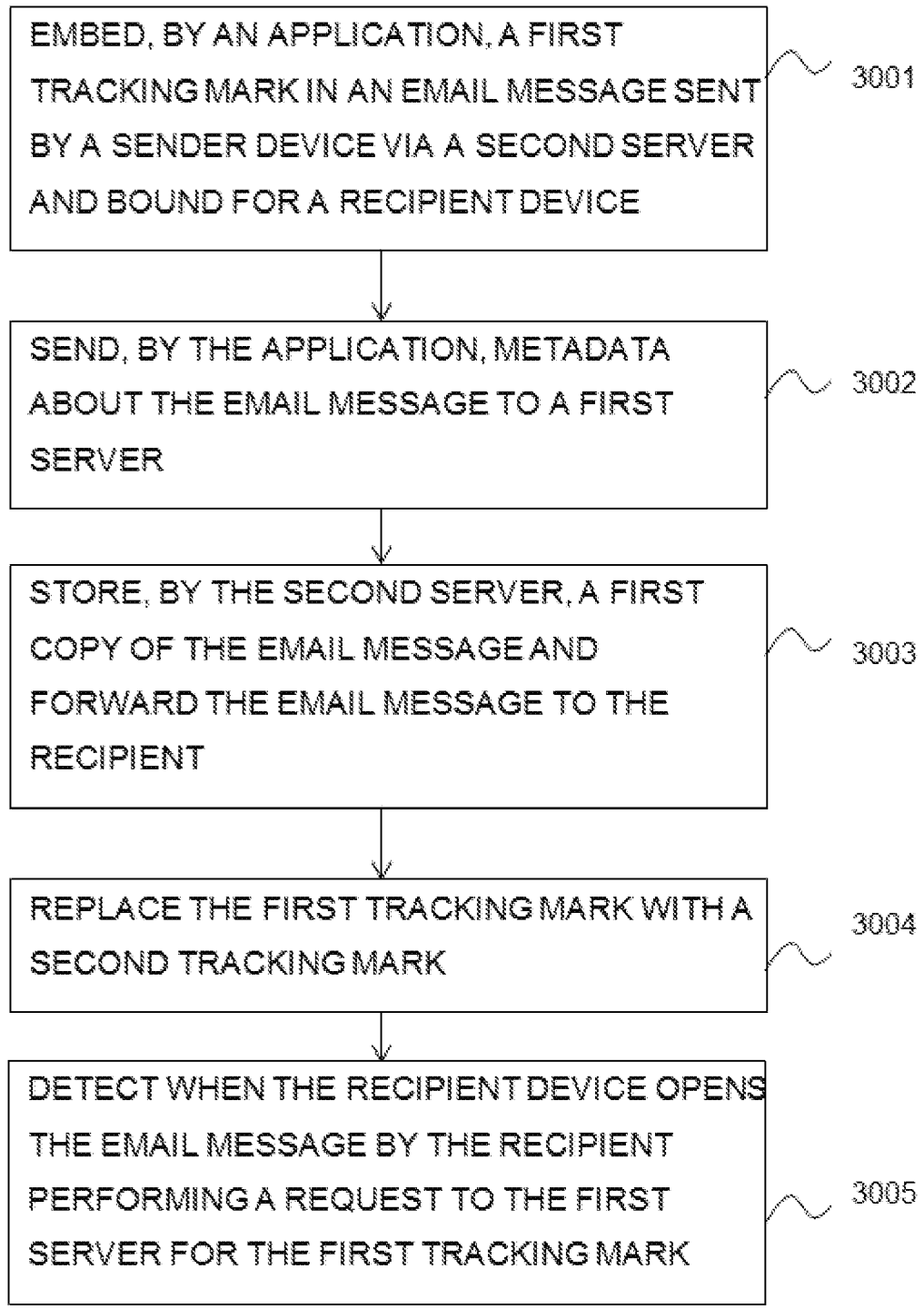
FIG. 5 is a flow diagram of a method for tracking an email message according to an embodiment of the present invention.

FIG. 5 is a flow diagram of a method for tracking an email message, according to an embodiment of the present invention. According to this particular embodiment, the email tracking application 11 embeds a first tracking mark in an email message 50 sent by the sender device 10 via the second server 200 and bound for the recipient device 20 (step 3001), and further sends metadata 40 related with the email message 50 to the first server 100 (step 3002). Upon reception of the email message 50, the second server 200 stores a first copy thereof 51 in the memory 201 and further forwards the email message 50 to the recipient device 20 (step 3003). Then, at step 3004, the first copy of the email message 51 is replaced by a second copy 52. Preferably, this replacement is requested by the first server 100.

Detection of the opening of the email message 50 by the recipient device 20 is performed by the first server 100 by receiving a request for the embedded first tracking mark from the recipient device 20. This request can be done either directly or using the third server 300.

Modern email message systems create email messages with complex structures to represent different versions of the content (e.g. plain text vs. HTML versions), sub-elements of the email message (e.g. embedded images), elements additional to the email message (e.g. attachments), etc. These are "packed" (transformed into a stream of bytes) using the MIME standards as specified in several IETF RFCs (RFC 2045, RFC 2046, RFC 2047, RFC 2048, RFC 2049, RFC 2183). An embodiment to remove or replace the first tracking mark would thus be to unpack the email message 50, edit the richtext (HTML) main body to remove or replace the first tracking mark, then repack the email message 50. Many libraries exist for packing and unpacking such MIME messages, but testing with some of them showed that unpacking a message and repacking it could deliver results very different from the original (e.g. with an embedded image transformed into an attached one). This is highly undesirable because the expectation of the sender device 10 is that the copy of the email message which is kept in the memory 201 be identical to the one received by the recipient device 20.

Therefore, present invention proposal is to replace the first tracking mark without unpacking. This requires discovery of the different encoding mechanisms and specific implementations used by the second server 200. Most email user agents send the richtext body either unencoded or using the "quoted-printable" or "base64" encodings. In the quoted-printable case, the byte stream may contain interleaved line breaks (ASCII characters equals sign, carriage return, and line break), and ensuring that the structure of the encoded stream is preserved requires inserting these same line breaks in the same positions in the replacement marks (i.e. the second tracking mark and/or inactive mark). This latest operation is made much easier if the second tracking mark and/or the inactive mark are of the same length as the first tracking mark, which can easily be accomplished by using a short enough URL for the second tracking mark and/or the inactive mark and padding it with spaces to the desired length. Present invention preferably uses the following URL for the inactive mark:

data:image/gif;base64,R0lGODIhAQABAIAAAP///
        wAAACwAAAAAAQABAAACAkQBADs= which is a URL for a very small but highly compatible transparent single-pixel image, which being a "data:" URL does not need a request to a server to be rendered.

To replace the first copy of the email message 51 with the second copy 52 with guaranteed integrity, the first server 100 accesses the second server 200, reads the first copy of the email message 51 from the memory 201, creates the second copy of the email message 52, adds the second copy of the email message 52 to the memory 201 and deletes the first copy of the email message 51 from the memory 201. It is important; however, that previous operations are done in a way which guarantees that the first copy of the email message 51 will never be deleted without the second copy 52 having been stored, minimizing the possibility that the deletion of the first copy of the email message 51 will not be done after the second copy 52 has been stored.

According to an embodiment, a message identifier is embedded, by the second server 200, in a header field included in both of the first copy of the email message 51 and of the second copy of the email message 52. So, in case of failure of the process, for instance if it is not certainly known whether the second copy of the email message 52 was actually added in the memory 201, it is easy to search for both copies.

To launch the replacement of the first copy of the email message 51 with the second copy 52, present invention preferably waits, as said before, until the forwarding of the email message 50 has been done by the second server 200. To that end, the email tracking application 11 when embedding the first tracking mark, or after having done so, may further add an email address in a blind carbon copy (Bcc) field of the email message 50. This added email address is routed to a fourth server (in this case not illustrated) such as a SMTP server which will extract an identifier of email message and send an indication to the first server 100 to execute the replacement.

The identifier of the email message 50 can be obtained in several ways: (a) by parsing the email message 50 in search for its tracking mark; (b) by parsing the email message header's for the message identifier header; or (c) by having the email tracking application 11 add the necessary identifier in the local part of the Bcc address, either as the user identifier (e.g. 157c2a835c1bb6eb@debeaconizer.mailtrack.io) or as a sub-address as per RFC 5233 (e.g. trigger+157c2a835c1bb6eb@debeaconizer.mailtrack.io).

To reduce visual noise, the email tracking application can hide the Bcc address in the interfaces of the email user agents in which it is installed.

According to another embodiment, the replacement of the first copy of the email message 51 by the second copy 52 is triggered by a timer set up by the email tracking application 11, configured to time out a certain period of time after the sending of the email message 50 by the sender device 10. For instance a timer of about 3 minutes, not limitative, as other periods of time are also possible.

In addition, according to another embodiment, the second server 200 sends the pair of identifiers (the identifier of the first copy of the email message and the identifier of the second copy) to the email tracking application 11 at the end of the replacement process. The email tracking application then intercepts any requests to the second server 200 (using any of the interception methods commonly used by web-browser extensions), detects any requests to send a reply to the first copy of the email message 51 and, if the response doesn't come with the correct "reply-to" and thread message identifiers, injects them in the response before it is handed back to the sender email user agent, tricking it into presenting the reply below the first copy of the email message 51 as expected by the sender.

The scope of the present invention is defined in the following set of claims.

The invention claimed is:

1. A method for tracking an email message, the method comprising:
   a) embedding, by an email tracking application executed in a sender device, a first tracking mark in an email message to be sent to at least one recipient device via at least one second server;
   b) sending, by the email tracking application, metadata related with the email message to at least one first server;
   c) storing, by the at least one second server, a first copy of the email message in a memory thereof and forwarding the email message to said at least one recipient device; and
   d) detecting when the at least one recipient device opens the email message by the recipient device requesting the embedded first tracking mark to said at least one first server, directly or using a third server as a proxy, characterized in that the method comprises, before or after said step d) being performed, replacing said first copy of the email message with a second copy of the email message, said second copy of the email message including no tracking mark, or having embedded therein a second tracking mark different to and instead of the first tracking mark, or having embedded therein an inactive mark instead of the first tracking mark.

2. The method of claim 1, wherein the replacing of the first copy of the email message with the second copy being performed after the first server having accessed the second server, having read the first copy of the email message and having created the second copy of the email message.

3. The method of claim 1, wherein the replacing being enacted by the first server requesting the storage of the second copy of the email message into the second server and also requesting the deletion of the first copy of the email message from said second server.

4. The method of claim 2, wherein a message identifier is embedded, by the second server, in a header field included in both of the first copy of the email message and of the second copy of the email message.

5. The method of claim 1, wherein the email tracking application in said step a) further adds an email address in a blind carbon copy, Bcc, field of said email message, the added email address causing further transmission of the email message by the second server to a fourth server which upon reception sends an indication to the first server to execute said replacing of the first copy of the email message with the second copy of the email message.

6. The method of claim 1, further comprising setting, by the first server, a timer configured with a certain period of time for performing the replacing of the first copy of the email message with the second copy, the replacing being triggered once said configured certain period of time has lapsed.

7. The method of claim 1, wherein once the replacing of the first copy of the email message with the second copy has been performed, the first server further sends a message identifier of the email message and a message identifier of the first copy of the email message to the email tracking application.

8. The method of claim 1, wherein the second tracking mark and/or the inactive mark being of a same length as the first tracking mark.

9. The method of claim 1, wherein the inactive mark comprises a uniform resource locator, URL, using a "data:" schema.

10. The method of claim 1, wherein the first tracking mark, second tracking mark and/or inactive mark comprise a tracking pixel.

11. The method of claim 1, wherein the email tracking application (11) being implemented as a web-browser based application.

12. The method of claim 1, wherein the email tracking application being implemented as software application executed within a non-web-based email user agent.

13. The method of claim 1, wherein the replacing of the first copy of the email message by the second copy being performed via an Internet Message Access Protocol, IMAP, or via an Application Programming Interface, API.

14. The method of claim 1, further comprising:
   accessing the email message stored in said memory through a different sender email user agent; and
   receiving, by said different sender email user agent, from the second server, the second copy of the email message, wherein in case the second copy of the email message having embedded therein the second tracking mark, the different sender email user agent further requesting the second tracking mark to the first server.

15. A system for tracking an email message, comprising:
   a sender device configured to use an email tracking application for embedding a first tracking mark in an email message to be sent to at least one recipient device via at least one second server and for sending metadata related with the email message at least one first server;
   said at least one recipient device;
   said at least one second server configured to store a first copy of the email message in a memory thereof and to forward the email message to the recipient device; and
   said at least one first server configured to detect when the at least one recipient device opens the email message by receiving a request for the first tracking mark from the at least one recipient device, either directly or via a third server used as a proxy, the system being characterized in that:
   said first server is further configured to, either before or after said detection being performed, request to said second server the replacement of said first copy of the email message with a second copy of the email message, said second copy of the email message (52) including no tracking mark, or having embedded therein a second tracking mark different to and instead of the first tracking mark, or having embedded therein an inactive mark instead of the first tracking mark.

16. The system of claim 15, wherein said request is transmitted using an Internet Message Access Protocol, IMAP, or an Application Programming Interface, API.

17. The system of claim 15, further comprising a fourth server configured to receive, from the second server, a blind carbon copy, Bcc, of said email message, and configured to further send an indication to the first server to execute said replacing of the first copy of the email message with the second copy.

18. The system of claim 15, wherein the first tracking mark, second tracking mark and/or inactive marks comprise a tracking pixel.

* * * * *